(12) United States Patent
Longobardi et al.

(10) Patent No.: US 10,771,655 B2
(45) Date of Patent: Sep. 8, 2020

(54) SYSTEM AND METHOD FOR TRANSFERRING A DOCUMENT

(71) Applicant: HCL Technologies Italy S.p.A, Vimodrone (IT)

(72) Inventors: Giuseppe Longobardi, Via Pio Emanuelli (IT); Giovanni Palumbo, Via Pio Emanuelli (IT)

(73) Assignee: HCL Technologies Italy S.p.A., Vimodrone (Milan) (IT)

( * ) Notice: Subject to any disclaimer, the term of this patent is extended or adjusted under 35 U.S.C. 154(b) by 0 days.

(21) Appl. No.: 16/226,728

(22) Filed: Dec. 20, 2018

(65) Prior Publication Data

US 2020/0204706 A1 Jun. 25, 2020

(51) Int. Cl.
*H04N 1/44* (2006.01)
*H04N 1/00* (2006.01)
*H04N 1/32* (2006.01)

(52) U.S. Cl.
CPC ....... *H04N 1/4486* (2013.01); *H04N 1/00209* (2013.01); *H04N 1/32101* (2013.01)

(58) Field of Classification Search
CPC ............ H04N 1/4486; H04N 1/00209; H04N 1/32101; H04N 1/0044; H04N 1/444
See application file for complete search history.

(56) References Cited

U.S. PATENT DOCUMENTS

| | | | |
|---|---|---|---|
| 5,491,563 A | 2/1996 | Pomerantz | |
| 5,530,755 A | 6/1996 | Pailles et al. | |
| 5,541,993 A | 7/1996 | Fan et al. | |
| 5,905,801 A | 5/1999 | Serinken | |
| 6,542,261 B1 | 4/2003 | McGraw | |
| 8,290,160 B1 | 10/2012 | Steeger | |
| 8,482,810 B2 | 7/2013 | Harrington | |
| 8,713,330 B1 | 4/2014 | Sommer et al. | |
| 2004/0047467 A1 | 3/2004 | Hall et al. | |
| 2009/0220076 A1* | 9/2009 | Kuraki | H04N 1/44 380/54 |

(Continued)

FOREIGN PATENT DOCUMENTS

EP 2210406 A1 7/2010

OTHER PUBLICATIONS

Machine translation of JP2018067153 (Year: 2016).*

*Primary Examiner* — Iriana Cruz
(74) *Attorney, Agent, or Firm* — HM Law Group LLP; Vanintheran Moodley

(57) ABSTRACT

The present disclosure relates to system(s) and method(s) for transferring a document. The system receives a document comprising a set of letters, corresponding to a first area, and a set of images, corresponding to a second area. The system divides the first area into a first set of chunks and the second area into a second set of chunks. Further, the system adds a set of dummy chunks to the first set of chunks and the second set of chunks to generate a modified first set of chunks and a modified second set of chunks. Furthermore, the system rearranges position and dimensions of each chunk to generate a modified first area and a modified second area. The system generates a scrambled document based on the modified first area and the modified second area. The system further transfers the scrambled document to a receiver.

10 Claims, 3 Drawing Sheets

(56) References Cited

U.S. PATENT DOCUMENTS

2010/0271666 A1* 10/2010 Kimura ................ G06F 21/608
                                                                                    358/3.26
2015/0261477 A1* 9/2015 Inui ...................... G06F 3/1258
                                                                                    358/3.24

* cited by examiner

SYSTEM AND METHOD FOR TRANSFERRING A DOCUMENT

CROSS-REFERENCE TO RELATED APPLICATIONS AND PRIORITY

The present application does not claim priority from any patent application.

TECHNICAL FIELD

The present disclosure in general relates to the field of secure document transfer. More particularly, the present invention relates to a system and method for transferring a document.

BACKGROUND

Currently, fax machines are used at every business to send different documents via fax. In this case, a fax number is available to public. Once the document is send via fax, the receiver may get the document printed using a printer. Also, at the time of sending the fax, a user, sending the document, can select if he wants to receive an acknowledgement from the receiver. However, at work places, the fax machines remain unattended. Hence, there is no guarantee that the fax will reach to an entitled person. Thus, the confidential data may be available to a wrong person and problem of security arises. Further, some fax machines have provision of sending an alert to the receiver before sending the fax. In this case, the receiver might not be present to pick up the fax at the time it is sent. Further, during peak time, if number of faxes are received at the same time, then there exists delay in printing the received document.

SUMMARY

Before the present systems and methods for transferring a document, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for transferring a document. This summary is not intended to identify essential features of the claimed subject matter nor is it intended for use in determining or limiting the scope of the claimed subject matter.

In one implementation, a system for transferring a document is illustrated. The system comprises a memory and a processor coupled to the memory, further the processor is configured to execute programmed instructions stored in the memory. In one embodiment, the processor may execute programmed instructions stored in the memory for receiving a document comprising a set of letters and a set of images. The set of letters may correspond to a first area in the document. The set of images may correspond to a second area in the document. The processor may further execute programmed instructions stored in the memory for dividing the first area into a first set of chunks and the second area into a second set of chunks. Each chunk, from the first set of chunks and the second set of chunks, may correspond to a predefined shape from a set of predefined shapes. Further, the processor may execute programmed instructions stored in the memory for adding a set of dummy chunks to the first set of chunks and the second set of chunks to generate a modified first set of chunks and a modified second set of chunks. Furthermore, the processor may execute the programmed instructions stored in the memory for rearranging position and dimensions of each chunks, from the modified first set of chunks and the modified second set of chunks, based on a scrambling algorithm, to generate a modified first area and a modified second area. The processor may execute the programmed instructions stored in the memory for generating a scrambled document based on the modified first area and the modified second area. Further, the processor may execute the programmed instructions stored in the memory for transferring the scrambled document to a receiver.

In another implementation, a method for transferring a document is illustrated. In one embodiment, the method may comprise receiving a document comprising a set of letters and a set of images. The set of letters may correspond to a first area in the document. The set of images may correspond to a second area in the document. The method may further comprise dividing the first area into a first set of chunks and the second area into a second set of chunks. Each chunk, from the first set of chunks and the second set of chunks, may correspond to a predefined shape from a set of predefined shapes. Further, the method may comprise adding a set of dummy chunks to the first set of chunks and the second set of chunks to generate a modified first set of chunks and a modified second set of chunks. Furthermore, the method may comprise rearranging position and dimensions of each chunks, from the modified first set of chunks and the modified second set of chunks, based on a scrambling algorithm, to generate a modified first area and a modified second area. The method may further comprise generating a scrambled document based on the modified first area and the modified second area. Further, the method may comprise transferring the scrambled document to a receiver.

In yet another implementation, a computer program product having embodied computer program for transferring a document is disclosed. In one embodiment, the program may comprise a program code for receiving a document comprising a set of letters and a set of images. The set of letters may correspond to a first area in the document. The set of images may correspond to a second area in the document. The program may further comprise a program code for dividing the first area into a first set of chunks and the second area into a second set of chunks. Each chunk, from the first set of chunks and the second set of chunks, may correspond to a predefined shape from a set of predefined shapes. Further, the program may comprise a program code for adding a set of dummy chunks to the first set of chunks and the second set of chunks to generate a modified first set of chunks and a modified second set of chunks. Furthermore, the program may comprise a program code for rearranging position and dimensions of each chunks, from the modified first set of chunks and the modified second set of chunks, based on a scrambling algorithm, to generate a modified first area and a modified second area. The program may comprise a program code for generating a scrambled document based on the modified first area and the modified second area. Further, the program may comprise a program code for transferring the scrambled document to a receiver.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "dividing", "adding", "rearranging", "generating", "transferring", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for transferring a document now described. The disclosed embodiments of the system and method for transferring the document are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for transferring the document is not intended to be limited to the embodiments illustrated, but is to be accorded the widest scope consistent with the principles and features described herein.

The present subject matter relates to transferring a document. In one embodiment, a document may be received. The document may comprise a set of letters, corresponding to a first area in the document, and a set of images, corresponding to a second area in the document. The first area may be divided into a first set of chunks and the second area may be divided into a second set of chunks. Further, a set of dummy chunks may be added to the first set of chunks and the second set of chunks. Based on addition of the set of dummy chunks, a modified first area and a modified second area may be generated. Further, position and dimensions of each chunk, from the modified first area and the modified second area, may be rearranged based on a scrambling algorithm. Further, a scrambled document may be generated based on the modified first area and the modified second area. The scrambled document may be further transferred to a receiver.

Figure 1:
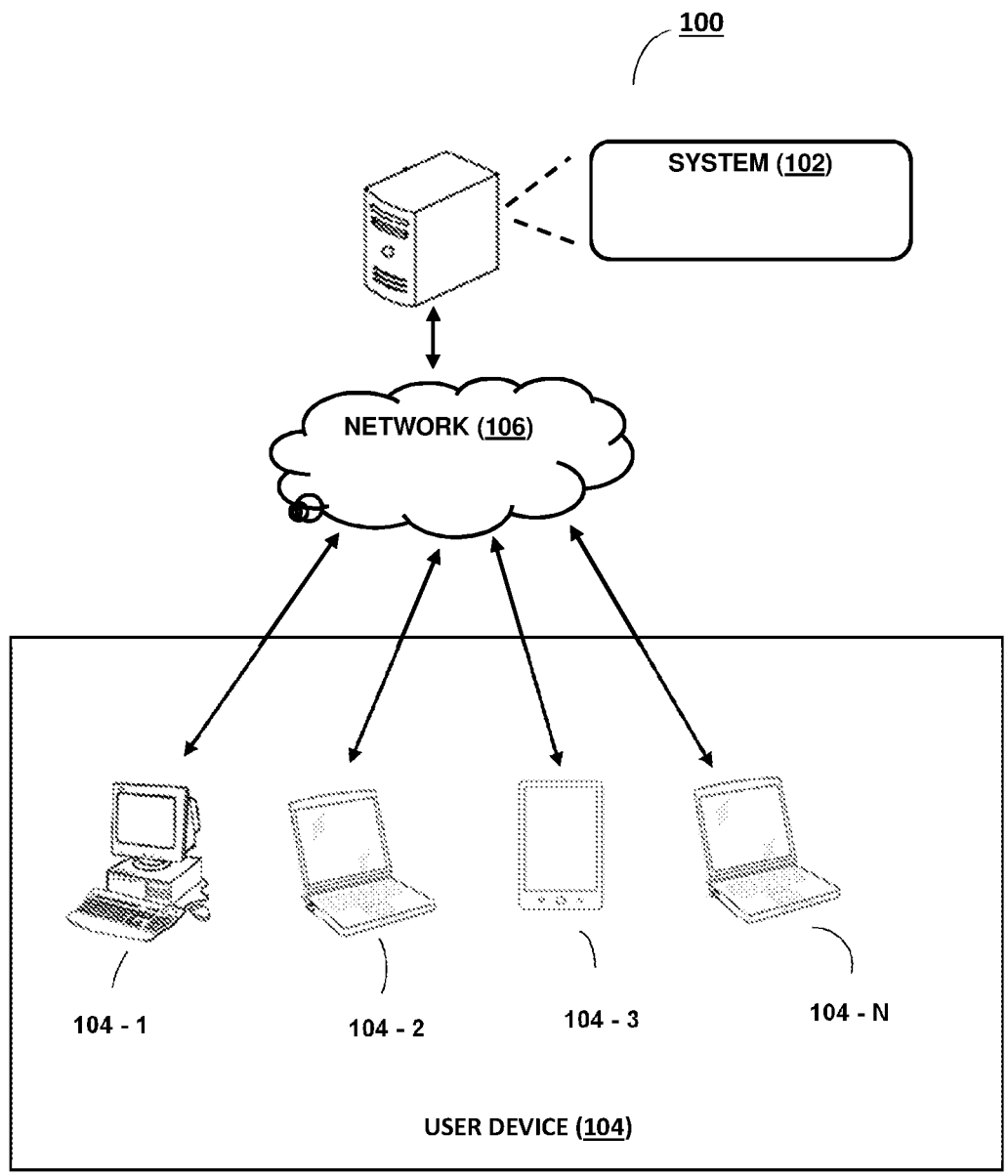
FIG. 1 illustrates a network implementation of system for transferring a document, in accordance with an embodiment of the present subject matter.

Referring now to FIG. 1, a network implementation 100 of a system 102 for transferring a document is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may receive a document. In one aspect, the document may be received based on a user inputs. The document may comprise a set of letters and a set of images. The set of letters may form a first area of the document. The set of images may form a second area of the document.

Once the document is receiver, the system 102 may divide the first area into a first set of chunks. Further, the system 102 may divide the second area into a second set of chunks. Each chunk, from the first set of chunks and the second set of chunks, nay correspond to a predefined shape, from a set of predefined shapes. In one embodiment, the set of predefined shapes may comprise a square, a rectangle, a triangle and the like.

Upon dividing the first area and the second area, the system 102 may add a set of dummy chunks to the first set of chunks and the second set of chunks. In one embodiment, the system 102 may generate a modified first set of chunks based on adding the set of dummy chunks to the first set of chunks. The system 102 may generate a modified second set of chunks based on adding the set of dummy chunks to the second set of chunks.

Once the set of dummy chunks are added, the system 102 may rearrange a position and dimensions of each chunks, from the modified first set of chunks and the modified second set of chunks. The position and dimensions of each chunk, from the modified first set of chunks and the modified second set of chunks, may be rearranged using a scrambling algorithm. Based on rearrangement of the position and dimension of each chunk, the system 102 may generate a modified first area, associated with the modified first set of chunks, and a modified second area, associated with the modified second set of chunks.

Further, the system 102 may generate a scrambled document based on the modified first area and the modified second area.

Once the scrambled document is generated, the system 102 may transfer the scrambled document to a receiver. The scrambled may be further reconstructed at the receiver. In one embodiment, a key code may be identified based on a day parameters, associated with the receiver. In another embodiment, the key code may be identified based on one or more dummy chunks, associated with the scrambled document. Once the key code is identified, a reverse algorithm, associated with the key code, may be applied on the scrambled document to reconstruct the document at the receiver.

Figure 2:
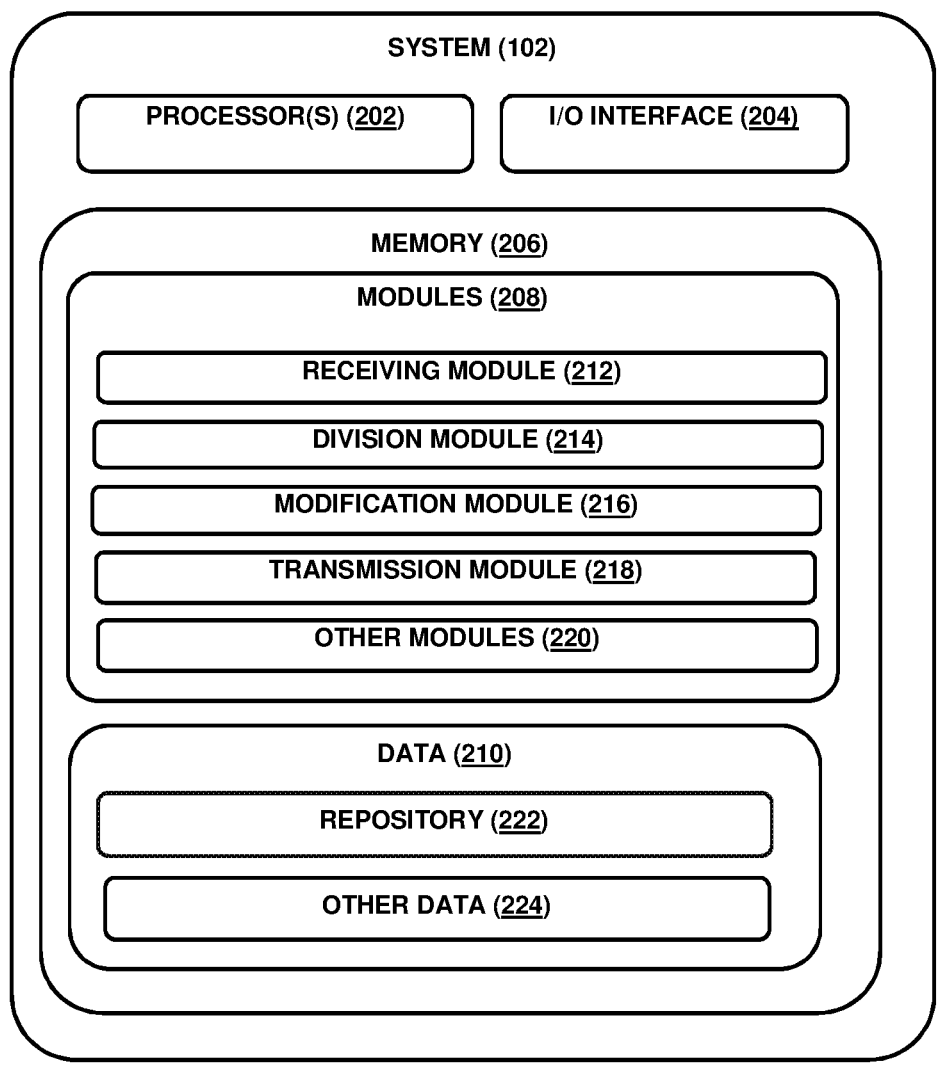
FIG. 2 illustrates the system for transferring a document, in accordance with an embodiment of the present subject matter.

Referring now to FIG. 2, the system 102 for transferring a document is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, a division module 214, a modification module 216, a transmission module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may receive a document. The document may be received based on a user inputs. The document may comprise a set of letters and a set of images. The set of letters may correspond to a first area of the document. The set of images may correspond to a second area of the document. The document may be a PDF document, a word document and the like.

Once the document is received, the division module 214 may divide the document into a set of set of chunks. In one embodiment, the division module 214 may divide the first area into a first set of chunks. The division module 214 may divide the second area into a second set of chunks.

In one embodiment, each chunk, from the first set of chunks and the second set of chunks, may correspond to a predefined shape from a set of predefined shapes. In other words, the chunks are of similar predefined shape from the set of predefined shapes. In another embodiment, the chunks, from the first set of chunks and the second set of chunks, may correspond to two or more predefined shapes, from the set of predefined shapes. In other words, the first set of chunks and the second set of chunks may be a mixture of different predefined shapes, from the set of predefined shapes, based on the compatibility.

In one aspect, dimensions and predefined shape of each chunk, from the first set of chunks, may be based on a font size, a font colour, an average number of letters corresponding to the set of letters and the like. Further, dimensions and predefined shape of each chunk, from the second set of chunks, may be based on an image size, an image colour corresponding to the set of images and the like.

The set of predefined shapes may comprise a square, a rectangle, a triangle and the like. In one example, each chunk, from the first set of chunks and the second set of chunks, may be a square. In another example, the first set of chunks and the second set of chunks may be a mixture of squares, rectangles and triangles.

Further, the modification module 216 may add a set of dummy chunks to the first set of chunks and the second set of chunks. Based on adding the set of dummy chunks to the first set of chunks, the modification module 216 may generate a modified first set of chunks. Based on adding the set of dummy chunks to the second set of chunks, the modification module 216 may generate a modified second set of chunks.

In one aspect, each chunk, from the set of dummy chunks, may correspond to a predefined shape compatible with the predefined shape of the chunks from the first set of chunks and the second set of chunks. In one aspect, the set of dummy chunks may correspond to chunks associated with letter, chunks associated with images and the like. In one example, the position of the set of dummy chunks to be added to the first set of chunks and the second set of chunks may be predefined. The set of chunks may be added to the first set of chunks and the second set of chunks to make data more complex.

Once the set of chunks are added, the modification module 216 may rearrange position and dimensions of each chunk, from the modified first set of chunks and the modified second set of chunks. The position and the dimensions of the chunks may be rearranged using a scrambling algorithm. Based on rearranging the position and dimensions of the chunks, from the modified first set of chunks, a modified first area may be generated. Based on rearranging the position and dimensions of the chunks, from the modified second set of chunks, a modified second area may be generated.

In one embodiment, rearranging the position and dimensions of the chunks may correspond to mixing the chunks or rotating the chunks based on the scrambling algorithm. The positions and the dimensions of the chunks may be rearranged to generate a complex data.

Once the modified first area and the modified second area are generated, the modification module 216 may generate a scrambled document. The scrambled document may comprise complex data. The scrambled document may also comprise the scrambled document used to generate the complex data.

Upon generating the scrambled document, the transmission module 218 may transfer the scrambled document to a receiver. In one aspect, the receiver may further reconstruct the document from the scrambled document. The scrambled document may be transferred via e-mail, fax, and the like.

In one embodiment, once the scrambled document is receiver, a key code may be identified from a repository. In one aspect, the key code may be identified based on day parameters, associated with the receiver. The day parameters may comprise day, date, time and location associated with the receiver. The key codes to be used at the day parameters may be predefined. In one example, if the scrambled document is received on date August 31 and at time 3:30 PM, the key code 29 may be defined.

In another aspect, the key code may be identified based on analysis of the scrambled document. Based on analysis of scrambled document, one or more chunks may be identified. The one or more chunks may be compared with chunks stored in a chunk repository at the receiver. Based on the comparison, the key code associated with the one or more chunks may be identified.

In yet another aspect, the key code may be embedded into the scrambled document. Thus, based on analysis of the scrambled document, the key code may be identified.

Once the key code is identified, a reverse algorithm associated with the key code may be identified. The reverse algorithm may correspond to a descrambling algorithm. The revere algorithm may be applied on the scrambled document and the document may be retrieved. In one embodiment, the reverse algorithm may be directly identified based on analysis of the scrambled document.

Exemplary embodiments discussed above may provide certain advantages. Though not required to practice aspects of the disclosure, these advantages may include those provided by the following features.

Some embodiments of the system and the method is configured to securely transfer the document from one place to another.

Some embodiments of the system and the method is configured to scramble each page of the document using scrambling algorithm.

Figure 3:
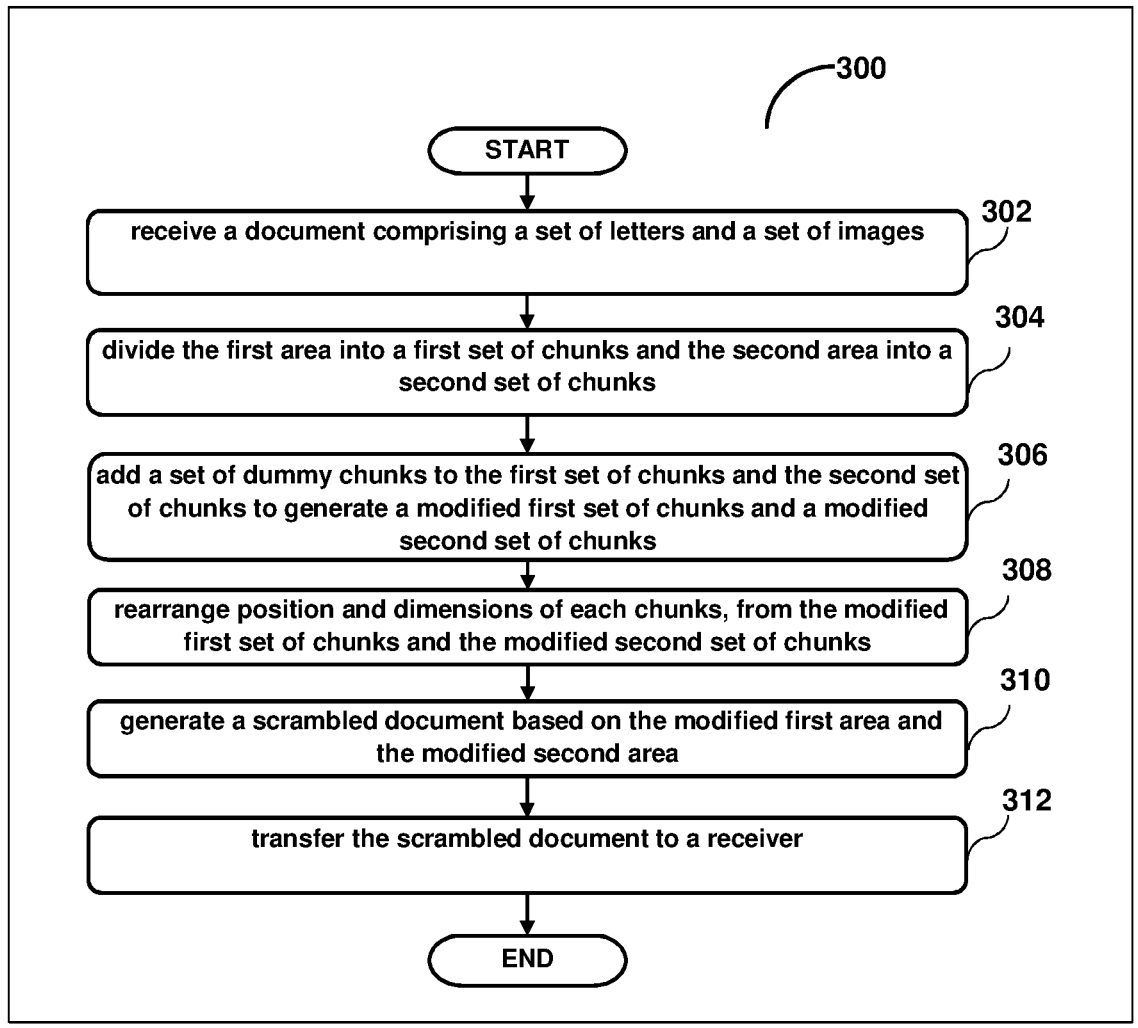
FIG. 3 illustrates a method for transferring a document, in accordance with an embodiment of the present subject matter.

Referring now to FIG. 3, a method 300 for transferring a document, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a document may be received. In one implementation, the receiving module 212 may receive the document. The document may comprise a set of letter and a set of images. The set of letters may correspond to a first area of the document. The set of images may correspond to a second area of the document.

At block 304, the first area may be divided into a first set of chunks and the second area may be divided into a second set of chunks. In one implementation, a division module 214 may divide the first area into the first set of chunks and the second area into the second set of chunks. Each chunk, from the first set of chunks and the second set of chunks, may correspond to a predefined shape, from a set of predefined shapes. In one embodiment, dimensions and predefined shape of each chunk, from the first set of chunks, may be based on a font size, a font colour, an average number of letters corresponding to the set of letters and the like. In another embodiment, each chunk, from the second set of chunks, may be based on an image size, an image colour corresponding to the set of images and the like.

At block 306, a set of dummy chunks may be added to the first set of chunks and the second set of chunks. In one implementation, the modification module 216 may add the set of dummy chunks to the first set of chunks and the second set of chunks. Based on adding the set of dummy chunks to the first set of chunks, a modified first set of chunks may be generated. Based on adding the set of dummy chunks to the second set of chunks, a modified second set of chunks may be generated.

At block 308, a position and dimensions of each chunk, from the modified first set of chunks and the modified second set of chunks, may be rearranged. In one implementation, the modification module 216 may rearrange the position and dimensions of each chunk, from the modified first set of chunks and the modified second set of chunks. In one aspect, the position and dimensions of each may be rearranged based on a scrambling algorithm. Based on rearranging the position and dimensions of each chunk, from the modified first set of chunks, a modified first area may be generated. Based on rearranging the position and dimensions of each chunk, from the modified second set of chunks, a modified second area may be generated.

At block 310, a scrambled document may be generated based on the modified first area and the modified second area. In one implementation, the modification module 216 may generate the scrambling document.

At block 312, the scrambled document may be transferred to a receiver. In one implementation, the transmission module 218 may transfer the scrambled document to the receiver. The receiver may be further configured to reconstruct the document from the scrambled document.

Although implementations for systems and methods for transferring a document have been described, it is to be understood that the appended claims are not necessarily limited to the specific features or methods described. Rather, the specific features and methods are disclosed as examples of implementations for transferring a document.

We claim:

1. A system for transferring a document, the system comprising
   a memory a processor coupled to the memory, wherein the processor is configured to execute programmed instructions stored in the memory to:

receive a document comprising a set of letters and a set of images, wherein the set of letters correspond to a first area in the document, and wherein the set of images correspond to a second area in the document;

divide the first area into a first set of chunks and the second area into a second set of chunks, wherein each chunk, from the first set of chunks and the second set of chunks, corresponds to a predefined shape from a set of predefined shapes;

add a set of dummy chunks to the first set of chunks and the second set of chunks to generate a modified first set of chunks and a modified second set of chunks;

rearrange a position and dimensions of each chunks, from the modified first set of chunks and the modified second set of chunks, based on a scrambling algorithm, to generate a modified first area and a modified second area, wherein the rearranging of the position and dimensions comprises one of mixing or rotating the chunks from the set of chunks;

generate a scrambled document based on the modified first area and the modified second area; and transfer the scrambled document to a receiver.

2. The system as claimed in claim 1, further configured to reconstruct the document at the receiver, wherein the reconstruction of the document comprises:

receiving the scrambled document at the receiver;

identifying a key code from a repository based on one of day parameters, associated with the receiver, or comparison of one or more dummy chunks with specific chunks stored in a chunk repository, wherein the one or more dummy chunks are identified based on analysis of the scrambled document; and reconstructing the document, at the receiver, based on execution of a reverse algorithm, associated with the key code, on the scrambled document.

3. The system as claimed in claim 1, wherein the day parameters comprise day, date, time and location associated with the receiver.

4. The system as claimed in claim 1, wherein the dimensions and the predefined shape of each chunk, from the first set of chunks, is based on a font size, a font colour, and an average number of letters corresponding to the set of letters.

5. The system as claimed in claim 1, wherein the dimensions and the predefined shape of each chunk, from the second set of chunks, is based on an image size, and an image colour corresponding to the set of images.

6. A method for transferring a document, the method comprises steps of:

receiving, by a processor, a document comprising a set of letters and a set of images, wherein the set of letters correspond to a first area in the document, and wherein the set of images correspond to a second area in the document;

dividing, by the processor, the first area into a first set of chunks and the second area into a second set of chunks, wherein each chunk, from the first set of chunks and the second set of chunks, corresponds to a predefined shape from a set of predefined shapes;

adding, by the processor, a set of dummy chunks to the first set of chunks and the second set of chunks to generate a modified first set of chunks and a modified second set of chunks;

rearranging, by the processor, a position and dimensions of each chunks, from the modified first set of chunks and the modified second set of chunks, based on a scrambling algorithm, to generate a modified first area and a modified second area, wherein the rearranging of the position and dimensions comprises one of mixing or rotating the chunks from the set of chunks;

generating, by the processor, a scrambled document based on the modified first area and the modified second area; and transferring, by the processor, the scrambled document to a receiver.

7. The method as claimed in claim 6, further comprises reconstructing the document at the receiver, wherein the reconstruction of the document comprises:

receiving the scrambled document at the receiver;

identifying a key code from a repository based on one of day parameters, associated with the receiver, or comparison of one or more dummy chunks with specific chunks stored in a chunk repository, wherein the one or more dummy chunks are identified based on analysis of the scrambled document; and reconstructing the document, at the receiver, based on execution of a reverse algorithm, associated with the key code, on the scrambled document.

8. The method as claimed in claim 6, wherein the day parameters comprise day, date, time and location associated with the receiver.

9. The method as claimed in claim 6, wherein the dimensions and the predefined shape of each chunk, from the first set of chunks, is based on a font size, a font colour, and an average number of letters corresponding to the set of letters.

10. The method as claimed in claim 6, wherein the dimensions and the predefined shape of each chunk, from the second set of chunks, is based on an image size, and an image colour corresponding to the set of images.

\* \* \* \* \*